Jan. 31, 1939.                D. A. WALTERS                2,145,841
                              GAUGING DEVICE
                           Filed Sept. 21, 1937
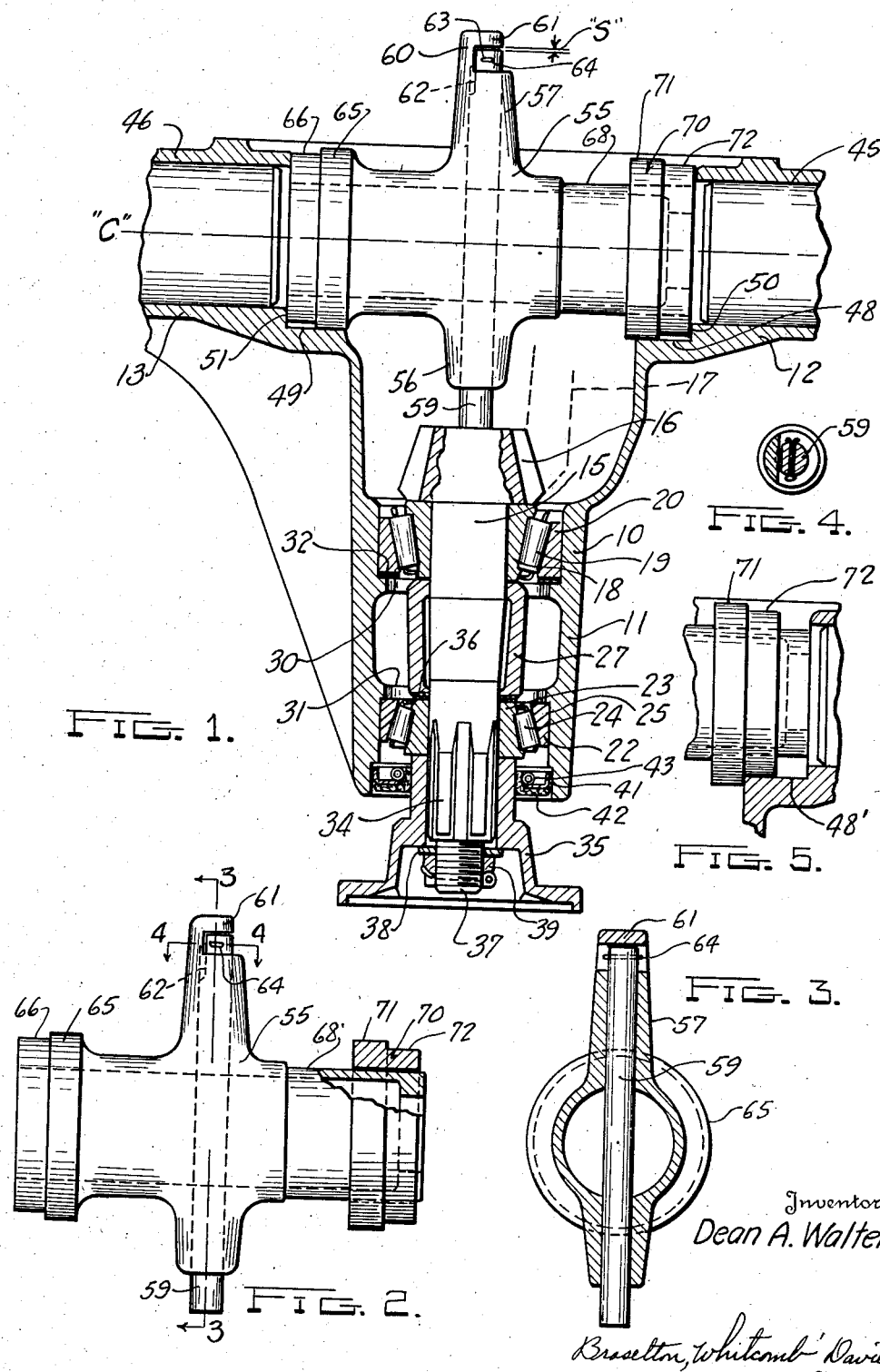
Inventor
Dean A. Walters
Broselton, Whitcomb & Davies
Attorney Patented Jan. 31, 1939

2,145,841

UNITED STATES PATENT OFFICE 2,145,841

GAUGING DEVICE

Dean A. Walters, Toledo, Ohio, assignor to Willys-Overland Motors, Inc., Toledo, Ohio, a corporation of Delaware Application September 21, 1937, Serial No. 164,920

10 Claims. (Cl. 33—181)

This invention relates to gauges and more particularly to gauges of a character adaptable for facilitating the positioning or assembling of gear mechanism or other mechanical elements. In the manufacture or assembly of axle drive mechanism or gearing, it is highly desirable, if not absolutely essential, that the driving gear properly mesh with the driven gear. To obtain this proper enmeshment, the pitch lines of the driving and driven gears should coincide and the assembly of the driving and driven gears in an axle drive of an automotive vehicle presents difficulties in determining the respective proper positions of these gears. The complexities of the problem are aggravated by reason of the use of shims to adjust one or both of the gears making up a gear set or drive.

An object of this invention is the provision of a gauge or gauging means for quickly and accurately determining the proper setting or positioning of the driving gear with respect to a driven gear.

Another object of the invention resides in the provision of a simple yet effective gauging means which is not only adapted for efficient use in properly setting the driving gear when the unit is initially assembled, but which is particularly adaptable wherever service replacements are needed in order to properly position the driving gear so that efficient and quiet enmeshment of the gears may be had.

Another object of the invention resides in the provision of a gauging means that may be utilized with different sizes of gears and where various sizes of bearings are used to support the gear mechanism.

A further object of the invention resides in a gauging means for adjusting gears which is provided with an element, the position of which immediately indicates to the workman the position of a pinion and from which may be directly determined the thickness of shim required for properly locating a driving pinion with respect to a driven gear.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a horizontal sectional view of a housing and driving pinion assembly of typical construction showing the gauging means of my invention in a position of use;

Figure 2 is a plan view of the gauging means of my invention;

Figure 3 is a sectional view through the gauging means taken substantially on the line 3—3 of Figure 2;

Figure 4 is a sectional detail view taken substantially on the line 4—4 of Figure 2;

Figure 5 is a fragmentary view showing the use of a gauge of my invention with a structure having different bearing size.

While I have shown the arrangement of my invention as utilized as gauging means for positioning driving pinions for drive axle assemblies, it is to be understood that I contemplate its utility for adjusting any type of mechanism wherever the same may be found to be useful.

The axle drive mechanism illustrated in Figure 1 with which the gauge of my invention has particular utility consists of an axle differential housing 10 of an automotive vehicle, which is preferably of integral cast formation having a driving pinion supporting portion 11 and axle bearing supporting portions 12 and 13. A typical installation of driving pinion for rear axle is disclosed including a shaft 15, upon which is integrally formed a driving pinion 16 adapted for enmeshment with a driven or main gear 17, the position of which is shown in dotted lines in Figure 1. The shaft 15 adjacent the pinion 16 carries the inner race 18 of a tapered roller bearing having rollers 19 and an outer race 20. Spaced from this bearing structure is a second roller bearing structure 22 comprising an inner race 23 mounted directly upon the shaft 15, tapered rollers 24, and an outer race 25. These bearing structures are so arranged as to resist both the radial load and longitudinal thrust of the driving pinion.

Interposed between the inner races 18 and 23 respectively of the bearings is a spacing collar 27 which serves to separate the bearing structure. The projection 11 of the housing 10 is provided with inwardly extending annular shoulders 30 and 31 which form seats or abutments for the outer races 20 and 25 of the bearings respectively. As hereinafter explained, shims 32 of varying thicknesses may be inserted between the outer race 20 and the shoulder 30 in order to properly adjust the position of the driving pinion 16, and shims 36 may be inserted between the bearing spacing means or collar 27 and one of the inner bearing races as hereinafter explained. The end of the shaft 15 is splined as at 34 to receive a member 35 which is also correspondingly splined to rotate with the shaft 15. The member 35 forms an element to which the main driving or propeller shaft (not shown) of the vehicle may be connected to actuate the drive pinion 16.

The splined end of the shaft 15 is provided with a reduced threaded tenon 37 upon which is positioned a washer 38 engageable with a portion of the member 35 and a threaded nut 39 which, when drawn up, holds the driving pinion in engagement with inner race 23 of bearing member 22 against the spacing collar 27. The extremity of the projection 11 of housing 10 is provided with an oil seal in the form of a sheet metal cup-like member 41 within which is positioned an annular sealing member 42 of felt or other suitable material which is held closely in engagement with a projecting portion of member 35 by means of a coil spring 43.

The portions 12 and 13 of the housing, which enclose and are secured to axle housings or tubes 45 and 46, are provided with semi-annular bearing seats 48 and 49, each having a shoulder 50 and 51 adapted to receive bearings (not shown) for supporting the vehicle axles.

The bearing seats 48 and 49 together with the shoulders 50 and 51 serve to accurately position bearings which carry the differential structure and associated mechanism (not shown) and as the bearing seats 48 and 49 are accurately machined about the center line C of the axles, these seats provide a satisfactory locating point from which may be determined the adjustment or proper setting of the drive pinion 16.

The gauging means or structure of my invention is inclusive of a body portion 55 having laterally extending projections 56 and 57 which are substantially in alignment. These projections are bored to snugly yet slidably receive a gauge pin or shaft 59. The projection 57 is provided with an extension 60 having a laterally extending abutment 61 forming a gauging surface for a purpose to be hereinafter explained. The end of shaft 59 adjacent the projection 60 is under-cut or relieved as at 62 in order to eliminate close machine work on the lateral wall of projection 60 adjacent the end of the shaft 59. There is provided an opening 63 in the shaft which is adapted to receive a cotter key 64 to prevent the inadvertent removal of the gauging shaft from the body member 55.

It is to be noted that the body member is preferably of hollow formation to decrease the weight of the gauge structure. The portion 55 is provided with a plurality of cylindrical gauging surfaces, there being two illustrated designated 65 and 66, the surface 65 being the gauging surface employed or contacting one of the axle supporting bearing seats 49 from which a gauge indication may be had as hereinafter explained. The other extremity of the member 55 is formed with a cylindrical tenon 68 upon which is snugly yet slidably supported an annular collar or member 70 which is provided with gauging surfaces 71 and 72 which in the gauge illustrated have the same respective diameters as those of gauging surfaces 65 and 66. In the illustration in Figure 1, the gauging surface 71 is adapted for engagement with the axle bearing surface 48 which with surface 65 engaging bearing surface 49 form the basic locating points or surfaces to determine the relative position of the driving pinion 16. It is to be noted that during gauging operations the end of gauge shaft 59 is spaced from the inner wall of the lateral projection 61 to admit the insertion of a thickness or "feeler" gauge.

In the use of the gauge of my invention with the radii of curvature of the surfaces 65 and 71 the same as the radii of curvature of the bearing seats 48 and 49, the gauge is positioned as shown in Figure 1 with the surfaces 65 and 71 in engagement with the axle bearing seats and the extremity of the gauge pin 59 in engagement with the face of driving pinion 16, which has been preliminarily assembled as illustrated in the drawing. With the pin 59 in contact with the pinion bearing 16, a thickness gauge is inserted in the slot or space S occurring between the other end of the pin 59 and the lateral projection 61. The gauge is so constructed that the width of slot S is normally a fixed dimension as, for example, a gauge of .010 inch thickness snugly fits in the slot for the correct setting or positioning of the drive pinion 16. Thus, by inserting thickness gauges in the slot S, a direct indication is given as to the thickness of shims 32 and 36 which must be inserted or taken out so as to properly position the bearing race 20 which in turn determines the position of the pinion 16. For example, if the constant or fixed width of slot S with the driving pinion 16 in the proper position is .010 of an inch, and it is found that upon the application of thickness gauges inserted in slot S that the slot is .014 inch in width, this indicates to the gauge user that a thickness of .004 inch in shims 32 and 36 must be inserted between the race 20 and the shoulder 30, and between spacing collar 27 and race 23 in the housing to bring the driving pinion 16 to its proper position for enmeshment with the main driven gear 17.

Figure 5 illustrates the use of the gauge with an arrangement wherein the axle supporting bearings are of a different dimension, in which construction another series of surfaces may be utilized as positioning points for the gauge mechanism. In this arrangement the bearing seat 48' is of a radius equal to the radius of the cylindrical gauging surface 72 so as to properly position the gauge in a housing construction having smaller axle supporting bearings. When the surfaces 66 and 72 are used as illustrated in Figure 5, the collar 70 may be moved longitudinally so that the surfaces 65 and 71 project into the interior of the housing so as to permit the surfaces 66 and 72 to be properly and effectively utilized as gauging surfaces. While I have illustrated two sets of gauging or locating surfaces arranged in stepped or echelon relation, that is, surfaces of the proper diameter to accommodate different axle bearing supporting surfaces, it is to be understood that any number of locating surfaces may be provided and utilized in this manner without departing from the scope of the invention.

It is apparent that within the scope of the invention, modifications and different arrangements may be made other than is herein disclosed, and the present disclosure is illustrative merely, the invention comprehending all variations thereof.

What I claim is:

1. An apparatus for determining the position of a driving gear in a differential housing comprising, in combination, a body member; a gear engaging member movably supported upon the body member; means associated with said body member engageable with bearing seats in a differential housing for positioning the body member with respect to the differential housing, said body member having a projection positioned adjacent but spaced from said gear engaging member, the position of the gear engaging member with respect to said projection indicating the relative position of the gear in the housing.

2. An apparatus for determining the position of a driving pinion in a differential housing comprising, in combination, a body member having a bore therein; a pinion engaging pin slidably carried in the bore in said body member; a plurality of means associated with said body member having locating surfaces engageable with bearing seats in a differential housing for positioning the body member with respect to the differential housing, said body member having a portion positioned adjacent but spaced from said pinion engaging pin, the position of said pin with respect to the portion of the body member positioned adjacent thereto indicating the relative position of the driving pinion in the housing.

3. A gauging means comprising a body member having a bore therethrough; a work engaging member movably mounted in the bore, said body member having a relatively fixed locating surface; a movable element carried by the body member providing a relatively movable locating surface, said body member having a projecting portion normally spaced from the end of the movable work engaging member, the position of the work engaging member with respect to the projection determining the relative position of the work.

4. A gauging means comprising a body member having a bore therethrough; a work engaging member slidably mounted in the bore, said body member having a relatively fixed cylindrical surface; a movable element carried by body member and having a relatively movable cylindrical surface, said body member having a projecting portion normally spaced from the end of the work engaging member when the latter is in contact with the work, the position of the work engaging member with respect to the projection determining the relative position of the work.

5. A gauging means comprising a body member having a bore therethrough; a gear engaging member movably mounted in the bore, said body member having a fixed locating surface; an element movably supported upon said body member providing a movable locating surface, said body member having a projecting portion normally spaced from the end of the gear engaging member when the latter is in contact with the gear, the position of the gear engaging member with respect to the projection determining the relative position of the gear.

6. A gauging means comprising a body member having a bore therethrough; a work engaging member movably mounted in the bore, said body member having a fixed locating surface; an element movably carried by said body member and constituting a movable locating surface, said body member having a projecting portion normally spaced from the end of the work engaging member when the latter is in contact with the work, the position of the work engaging member with respect to the projection determining the relative position of the work.

7. A gauging means comprising a body member having a bore therethrough; a work engaging member movably mounted in the bore, said body member having a fixed locating surface; an element carried by said body member and constituting a movable locating surface, said body member having a projecting portion normally spaced from the end of the gear engaging member when the latter is in contact with the work, the position of the gear engaging member with respect to the projection determining the relative position of the gear; and means carried by said gear engaging member to hold the same in said body member.

8. An apparatus for determining the position of a driving pinion in a differential housing including a gauge frame member having a bore therethrough; a pinion engaging plunger slidably mounted in a bore in said frame member, said frame member having a projecting portion normally spaced from the extremity of said plunger; means carried by said plunger for slidably retaining the same in the frame member, said frame member being formed with a relatively fixed cylindrical gauge locating surface.

9. An apparatus for determining the position of a driving pinion in a differential housing including a gauge frame member having a bore therethrough; a pinion engaging plunger slidably mounted in a bore in said frame member, said frame member having a projecting portion normally spaced from the extremity of said plunger; means carried by said plunger for slidably retaining the same in the frame member, said frame member being formed with a relatively fixed cylindrical gauge locating surface; and a relatively movable gauge locating surface slidably mounted upon the gauge frame member.

10. An apparatus for determining the position of a driving pinion in a differential housing including a gauge frame member having a bore therethrough; a pinion engaging plunger slidably mounted in a bore in said frame member, said frame member having a projecting portion normally spaced from the extremity of said plunger; means carried by said plunger for slidably retaining the same in the frame member; said frame member being integrally formed with a series of juxtaposed gauge locating surfaces; a cylindrical portion formed on said gauge frame member; and an element slidably mounted upon the cylindrical extension of the frame member provided with a correspondingly spaced series of gauge locating surfaces.

DEAN A. WALTERS.